United States Patent
Roth et al.

(10) Patent No.: US 8,429,405 B2
(45) Date of Patent: Apr. 23, 2013

(54) SYSTEM AND METHOD FOR HUMAN ASSISTED SECURE INFORMATION EXCHANGE

(75) Inventors: Volker Roth, San Francisco, CA (US); Wolfgang H. Polak, Sunnyvale, CA (US); Eleanor G. Rieffel, Mountain View, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1368 days.

(21) Appl. No.: 11/863,993

(22) Filed: Sep. 28, 2007

(65) Prior Publication Data

US 2008/0195866 A1    Aug. 14, 2008

Related U.S. Application Data

(60) Provisional application No. 60/889,914, filed on Feb. 14, 2007.

(51) Int. Cl.
*H04L 9/32* (2006.01)
*H04L 9/00* (2006.01)

(52) U.S. Cl.
USPC .......................................... 713/171; 380/277

(58) Field of Classification Search .................. 713/168, 713/171; 380/277
See application file for complete search history.

(56) References Cited

U.S. PATENT DOCUMENTS

| | | | |
|---|---|---|---|
| 5,450,493 A | 9/1995 | Maher | |
| 7,606,370 B2 * | 10/2009 | Lillie et al. | 380/278 |
| 7,757,274 B2 * | 7/2010 | Lillie et al. | 726/4 |
| 7,761,710 B2 * | 7/2010 | Lillie et al. | 713/171 |
| 7,818,571 B2 * | 10/2010 | Kennedy | 713/168 |
| 7,822,972 B2 * | 10/2010 | Lillie et al. | 713/153 |
| 7,933,413 B2 * | 4/2011 | Steeves et al. | 380/278 |
| 8,271,786 B1 * | 9/2012 | Pradhan et al. | 713/169 |
| 2004/0111601 A1 * | 6/2004 | Racz | 713/150 |

FOREIGN PATENT DOCUMENTS

WO    WO 2004054167 A1 *    6/2004

OTHER PUBLICATIONS

Abdollah, "Ensnared on the Wireless Web," latimes.com, Mar. 16, 2007, http://www.latimes.com/news/local/la-me-wifihack16mar16,0,4434812,fullstory?coll=la-home-headlines.

Airsnarf, "Airsnarf—A rogue AP setup utility," The Shmoo Group, http://airsnarf.shmoo.com/.

Alkassar, "Secure Object Identification—or: Solving the Chess Grandmaster Problem," New Security Paradigms Workshop 2003, Ascona, Switzerland.

(Continued)

*Primary Examiner* — Zachary A Davis
(74) *Attorney, Agent, or Firm* — Sughrue Mion, PLLC (57) ABSTRACT

A system that assures a user that two specific devices have exchanged information correctly over an insecure communication channel. In a typical application, the channel would be a wireless network connection and the information would consist of the public keys of the two devices. The exchanged public keys would subsequently be used to secure any further communication between the two devices. The system requires that both devices have an output modality interpretable by a human. One of the devices must have an input modality that can be operated by the user. The input and output modalities can be very simple e.g., they can consist of a button and LEDs. The users would press the button multiple times. On each press, the LEDs on both devices display a color and the user compares the colors and that they are synchronous. A noticeable delay or color difference signifies a security threat.

16 Claims, 5 Drawing Sheets

OTHER PUBLICATIONS

Balfanz, "Talking to Strangers: Authentication in Ad-Hoc Wireless Networks," Network and Distributed System Security Symposium 2002 (NDSS'02), San Diego, CA, Feb. 2002.

Bellare, "Random Oracles are Practical: A Paradigm for Designing Efficient Protocols," Appears in the proceedings of the First ACM Conference on Computer and Communications Security, ACM, Oct. 20, 1995.

Biba., "Does your Wi-Fi Hotspot Have an Evil Twin?" PCWorld, Mar. 15, 2005.

Bussard, "Embedding Distance-Bounding Protocols within Intuitive Interactions," Institut Eurecom Corporate Communications.

Cagalj, "Key Agreement in Peer-to-Peer Wireless Networks," Proceedings of the IEEE, vol. 94, No. 2, Feb. 2006.

Dohrmann, "Public-Key Support for Collaborative Groups," $1^{st}$ Annual PKI Research Workshop-Proceedings, Intel Labs, pp. 139-148.

Fleishman, "My Evil Twin," WNN Wi-Fi Net News, Jan. 20, 2005.

Gerhmann, "Manual authentication for wireless devices," Nokia Research Center, Helsinki, Finland, Jan. 23, 2004.

Goodrich, "Loud and Clear: Human-Verifiable Authentication Based on Audio," Department of Computer Science, University of California, Irvine, pp. 1-15.

Haller; "A One-Time Password System," Copyright, The Internet Society, Feb. 1998.

Hoare, "An Axiomatic Basis for Computer Programming," The Queens University of Belfast, Northern Ireland, Communications of the ACM, vol. 12, No. 10, Oct. 1969.

Kumaraguru, "Privacy Indexes: A Survey f Westin's Studies," CMU-ISRI-5-138, Dec. 2005, Pittsburgh, PA.

Kuo, "Low-cost Manufacturing, Usability, and Security: An Analysis of Bluetooth Simple Pairing and Wi-Fi Protected Setup," Carnegie Mellon University.

Laur, "Efficient Mutual Data Authentication Using Manually Authenticated Strings," Helsinki University of Technology, Finland.

McCune, "Seeing-Is-Believing: Using Camera Phones for Human-Verifiable Authentication," A Thesis, Electrical and Computer Engineering, Pittsburgh, PA, May 2005.

Meadows, "Evil Twin Hotspots are a New Menace for Internet Users, Warns Cranfield University," Cranfield University, Marketing and Communication, Jan. 14, 2005 http://www.cranfield.ac.uk/university/press/2005/14012005.cfm.

Miller, "The Magical Number Seven, Plus or Minus Two: Some Limits on Our Capacity for Processing Information," originally published in the Psychological Review, 1956, vol. 63, pp. 81-97.

Perrig, "Hash Visualization: a New Technique to improve Real-World Security," Computer Science Department, Carnegie Mellon University, Pittsburgh, PA.

Rekimoto, "SyncTap: An Interaction Technique for Mobile Networking," Interaction Laboratory, Sony Computer Science Laboratories, Inc. Tokyo, Japan.

Saltzer, "Protection and the Control of Information Sharing in Multics," Massachusetts Institute of Technology, Copyright 1974, Association for Computing Machinery, Inc., Communications of the ACM, Jul. 1974, vol. 17, No. 7.

Sastry, "Secure Verification of Location Claims," WiSE'03, Sep. 19, 2003, San Diego, CA, Copyright 2003, ACM.

Saxena, "Secure Device Pairing based on a Visual Channel," University of California, Irvine.

Stajano, "The Resurrecting Duckling: Security Issues for Ad-hoc Wireless Networks," Security Protocols, $7^{th}$ International Workshop, Copyright Springer-Verlag Berlin Heidelberg 1999.

Suomalainen, "Security Associations in Personal Networks: A Comparative Analysis," Nokie Research Center Helsinki, VTT Technical Research Centre of Finland, Sep. 1, 2007.

Thomson, "Evil Twin Wi-Fi hacks target the rich," VNU Business Publications, 2006.

Uzun, "Usability Analysis of Secure Pairing Methods," Nokia Research Center technical report NRC-TR-2007-002.

Vaudenay, "Secure Communications over Insecure Channels based on Short Authenticated Strings," Ecole Polytechnique Ferderale de Lausanne, Crypto '05.

Vogel, "Neural activity predicts individual differences in visual working memory capacity," Department of Psychology, University of Oregon, Eugene, OR, Nature Publishing Group, vol. 428, Apr. 15, 2004.

* cited by examiner

| User's Device $A$ | | Access Point $B$ |
|---|---|---|
| $(c_A, d_A) := \text{commit}(1, m_A, N_A)$, send $c_A$ | $\rightarrow$ | receive $c_A$ |
| receive $c_B$ | $\leftarrow$ | $(c_B, d_B) := \text{commit}(0, m_B, N_B)$, send $c_B$ |
| send $d_A$ | $\rightarrow$ | receive $d_A$, $(1, m'_A, N'_A) = \text{open}(c'_A, d'_A)$ |
| receive $d'_B$, $(0, m'_B, N'_B) = \text{open}(c'_B, d'_B)$ | $\leftarrow$ | send $d_B$ |
| $i_A := N_A \oplus N'_B$ | $\leftarrow$ Auth. $\rightarrow$ | $i_B := N'_A \oplus N_B$ |

*Figure 10*

SYSTEM AND METHOD FOR HUMAN ASSISTED SECURE INFORMATION EXCHANGE

RELATED APPLICATIONS

This Application claims priority from Provisional Application, Ser. No. 60/889,914, filed Feb. 14, 2007, the disclosure of which is incorporated herein in its entirety.

BACKGROUND

1. Field of the Invention

The subject invention relates to secure electronic communication over an insecure communication channel. More specifically, the subject invention relates to systems and methods that can assure a user that two specific devices have exchanged information correctly over an insecure communication channel, even if the two devices did not share a secret or a common root of trust beforehand.

2. Related Art

Mobile devices proliferate and increasingly users need to transmit information between mobile devices and other devices in an ad hoc fashion. Generally the transmission is performed over an efficient in-hand channel such as a wired or wireless connection (WiFi, Bluetooth, etc.).

However, in order to prevent inadvertent information leakage, eavesdropping, and fraud, users must assure that the two given devices communicate with each other (the devices pair with each other) and do so securely. This is difficult to achieve if the devices do not share a secret or a common root of trust prior to the pairing. This would be typical on a random first encounter or if the storage capacity of a device is insufficient to retain current security associations with all other devices with which it has to pair. Conversely, having to exchange a common root of trust a priori undermines the basic premise of services such as free WiFi access points. The driver behind the proliferation of free WiFi is easy connectivity without prior knowledge of the characteristics of the WiFi access point.

Secure communication in such situations may be achieved through known anonymous key exchange protocols, which, without additional safeguards, are vulnerable to fraudulent activities, such as man-in-the-middle attacks. In man-in-the-middle attack, both devices exchange cryptographic keys with an adversary rather than with each other. This results in two separate secure connections, one between the first device and the adversary and another connection between the adversary and the target device. By relaying between the two devices, the adversary learns the entire communication between the two devices.

While the invention is applicable to any type of communication between two devices, The WiFi environment may be used to explain the various problems involved and highlight the benefit of the proposed solution. As wireless technology proliferates there is a growing concern about fraud and phishing attacks based on so-called "evil twin" wireless access points. The evil twin is deployed and controlled by a malicious adversary and mimics a genuine access point. Public places, like cafes or airport terminals, are particularly susceptible to this form of attack. Unsuspecting users who bind to the evil twin compromise their network communications: their login information and passwords can be stolen, or their browsers redirected to look-alike phishing websites and download pages containing malware.

Typically, evil twins have similar names to legitimate hotspots, including names that fit with the location. That many hotspot owners use generic names for their hotspots, like "hotspot" or the name of the service provider, exacerbates this problem. Particularly susceptible are the many laptops, and other wireless devices, configured to automatically connect to an access point that has the same name as one it previously used, or to the access point with the strongest signal. The ease with which an evil twin can be set up has been demonstrated using, for example, Airsnarf, a wireless access point setup utility designed to demonstrate how rogue access point can steal usernames and passwords from public wireless hotspots.

Since evil twins provide gateway services and DNS settings to connecting clients, hackers gain full control over the clients' network communications. For instance, the evil twin may map the authentic domain name of a banking website to the IP number of a phishing website. This undermines a major trust indicator for the user: the URL displayed in the user's browser, i.e., while the user sees the proper URL in its browser, the address has been hijacked and the user is actually connected to a phishing website. Additional tools, such as Ettercap, come with extensive support for man-in-the-middle attacks on unencrypted, and even encrypted, communications by generating fake certificates, for example. However, detection of intrusions or attacks is still difficult for users because the access point to which a user's device binds does not identify itself in a fashion that can be verified reliably by the user. Without cables, an important implicit ingredient of traditional security policies is missing: the assurance that the user's device is connected to a specific physical endpoint. Instead, wireless devices establish virtual endpoints through advertisement and discovery.

The evil twin problem is closely related to the general problem of pairing two wireless devices, which has attracted a significant amount of research. Standards are drafted that specify alternative security mechanisms for WiFi and Bluetooth. These standards prescribe mechanisms that involve the user in the secure setup of security associations between devices. Three principle mechanisms can be distinguished:

1. The user manually enters a code into both devices
2. One device displays a code, the user enters it into the second device
3. Both devices display a code, the user verifies them for equality.

The choice of mechanism depends on the combination of user interface types supported by the pairing devices.

Several authors have suggested means to facilitate the comparison of codes by rendering them on both devices as human-readable words, speech, flag-like symbols, or random art. These mechanisms can work well if the devices support appropriate user interfaces, but become difficult to apply if these user interfaces are limited A second (complementary) approach to improve the usability of the comparison task is to trade the length of the code against the attained level of security and the probability of a successful attack. Several authors suggested mechanisms based on this principle. A common realistic assumption is that if the user compares a value with n bits then the adversary should have to perform in the order of $2^n$ units of work in order to break a session of the mechanism with certainty. The cited mechanisms have this property and the prior art suggests that this result is optimal.

For further relevant information, the reader is encouraged to review: Dirk Balfanz, D. K. Smetters, Paul Stewart, and H. Chi Wong, *Talking to strangers: Authentication in ad-hoc wireless networks*, In Proceedings of Network and Distributed System Security Symposium 2002 (NDSS'02). San Diego, Calif., February 2002; Steve Dohrmann and Carl Ellison, *Public-key Support for Collaborative Groups*, In Proc.

1st Annual PKI Research workshop, pages 139-148, Gaithersburg. Md., USA. April 2002, National Institute for Standards and Technology; Michael T. Goodrich, Michael Sirivianos, John Soils, Gene Tsudik, and Ersin Uzun, *Loud And Clear: Human Verifiable Authentication Based on Audio*, in Proc. 26th International Conference on Distributed Computing Systems IEEE, July 2006; N. Heller, C. Metz, P. Nesser, and M. Straw, *A One-time Password System*, Internet Request for Comments 2289, Internet Engineering Task Force, February 1998; Jonathan M. McCune, Adrian Perrig, and Michael K. Reiter, Seeing-Is-Believing: Using Camera Phones for Human-veritable Authentication, in IEEE Symposium on Security and Privacy, pages 110-124, 2005; Jun Rekimoto, Yuji Ayatsuka, and Michimune Kohno, *SyncTap: An Interaction Technique for Mobile Networking*, in L. Chittaro, editor, Human-computer interaction with mobile devices and services (Mobile HCI 2003), number 2795 in Lecture Notes in Computer Science, pages 104-115, Springer Verlag, 2003; Nitesh Saxena, Jan-Erik Ekberg, Kari Kostiainen, and N. Asokan, Secure Device Pairing Based on a Visual Channel, in IEEE Symposium on Security and Privacy, May 2006; F. Stajano and R. J. Anderson, The Resurrecting Duckling: Security Issues for ad-hoc Wireless Networks; in Proc. 7th International Security Protocols Workshop, pages 172-194, 1999; M. Cagalj, S. Capkun, and J. P. Hubaux, Key Agreement in Peer-to-peer Wireless Networks, Proceeding of the IEEE, 94(2):467-478, February 2006.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to an aspect of the invention, a mechanism whereby a user can verify that two pairing devices exchanged their mutual keys is provided. The mechanism is easy to understand and use, has minimal user interface requirements, can be implemented cheaply, and exceeds what has been suggested as the optimal level of security for this class of mechanisms.

According to various aspects of the invention, a mechanism is provided to defeat evil twin attacks by enabling the user to easily verify the connection with a target while having little prior training or knowledge. The disclosed mechanism is "psychologically acceptable"; in other words, it is easy to understand and use by people who access the Internet from public locations such as cafes. A minimum of hardware is used, so that the mechanism could be used by a variety of devices, including small, inexpensive devices with limited display capabilities. According to various aspects of the invention, the methodology leverages existing key establishment protocols based on short authentication strings.

According to one embodiment of the invention, the wireless access point has a light capable of showing two colors, and the user device has at least one button in addition to such a display capability. Each short authentication string is converted into a color sequence composed of two different colors. Both the wireless access point and the user's device render the sequences one color at a time. The access point's light must be mounted where users can see it and have confidence that it relates to the authentic target access point. When the user presses a designated button on the user's device, both lights show the next color in the sequence. The colors are shown for as long as the button is held down, so that the user can see the colors as long as they need to effectively compare them. The user can choose how much of the sequence to compare depending on the desired level of security. Once the user has completed the comparisons, the user indicates acceptance or declining of the connection by means of a designated button or other means of input.

According to another aspect of the invention, communication between a user and a target device is verified. The user and target device have a user verification device, such as a light capable of displaying two or more colors, and the user's trusted device has one button for the user's input. When the user clicks the button, both devices light at a color determined by a given function. A color difference or noticeable delay between the lights indicates an active attack. The user may perform multiple rounds of this simple interaction and more rounds increase the security. The mechanism leverages randomness in users' button clicks or utilize a given random function to generate a series of light colors, and utilizes the user's clicks to advance the series in sequence. In one example, the light colors may depend on exchanged keys and accumulated clock readings at the times the user presses the button. The devices synchronize with a simple trigger signal. The clock rate is chosen such that a color-changing attack on the trigger signal manifests as a noticeable delay.

The inventive verification method and system defies the limitations suggested in the prior art. The mechanism works exceedingly well if the user's device has a button and both devices are capable of displaying a light with two alternative colors. At the same time, the mechanism requires that the adversary perform in the order of $\exp(\exp(n*\log(2))*\log(2))$ units of work to break a session with certainty if the user performs an n bit comparison. At this rate, the security of the inventive mechanism rapidly exceeds the security of the exchanged keys. Given only a 10 bit comparison, it is estimated that an adversary would have to perform on the order of $2^{114}$ units of work in exchange for a 0.3% probability of success. In order to increase this probability to 0.4% the adversary would have to perform on the order of $2^{397}$ units of work (these numbers are estimates based on actual laboratory measurements and may vary in practice). For comparison, factoring a 1024 RSA modulus with the General Number Field Sieve will take less than $2^{102}$ units of work, and less than $2^{137}$ units of work for a 2048 bit modulus.

The inventive mechanism accomplishes its advantages by leveraging randomness in users' button clicks. In this manner, the inventive mechanism separates the n bit comparison into n 1-bit comparisons. Each comparison starts when the user presses the button on his or her device. At this point, the device reads a synchronized input, such as an internal clock, and evaluates a 1-bit collision-resistant one-way function with the input and the exchanged data, such as exchanged keys, as its arguments. The result is translated into one of two colors. The click time is communicated to the pairing device by a simple trigger signal. Upon receipt of the trigger signal, the pairing device reads its own synchronized input, e.g., the internal clock, and performs the same calculation. If an internal clock is used as the synchronized input, then the clock rate is well-defined and chosen such that a potentially color-changing attack on the trigger signal leads to a noticeable lack of synchronization of the lights. This feature leverages a limitation of humans' visual perception. Humans perceive two events as synchronous as long as the delay between them does not exceed a certain threshold, which is known as the point of subjective equality (PSE). According to a further feature, the device reads a synchronized input, such as an internal clock, and evaluates a 1-bit collision-resistant one-way function with the exchanged data, such as exchanged keys, and all accumulated clock readings as its arguments. This provides additional security.

The security of the inventive mechanism can be understood in the following terms: both devices agree on a set of one-way functions, such as hash functions. Based on the exchanged data, e.g., public keys, the devices generate output using one of these functions. On each button press, the user samples from the function on both devices in increasingly random positions and verifies whether their output is the same. After a satisfactory number of rounds without inequality, the user concludes that the devices chose the same function using the same arguments. For this reason, the underlying principle is referred to as a human sampling function.

According to an aspect of the invention, a method for performing a verification process to secure a communication session between two devices communicating over an insecure line is disclosed, the verification process comprising: a.

exchanging predetermined sets of data between the two devices; b. using the set of data to generate in each device a sequence of discrete values; c. receiving an input from a user and using the input to select one of the discrete values at each device; d. using the selected discrete value to generate an output; e. presenting the output from both devices to the user for verification; and f. repeating steps c-e according to user input.

The predetermined sets of data may comprise public keys of the two devices. Upon receiving the user input in step c, the next sequential discrete value in the sequence may be selected. Step e may comprise illuminating a colored light, wherein the color is selected according to the discrete value selected in step c. The method may further comprise providing a synchronous input to the two devices. The method may further comprise using the user input to select a value from the synchronous input. Step d may comprise providing the predetermined sets of data and the selected value into a pre-specified function and using the resulting value of the function to generate the output. The pre-specified function may be a hash function. Generating the output may further comprise using the resulting value of the function to generate at least one of a discrete visual, audible, and tactile output. The output may comprise a synchronized colored light on the two devices. The two devices may be mobile devices. The mobile devices may be wearable devices.

According to another aspect of the invention, a mobile device capable of alerting a user to an attack on an insecure communication channel used by the device is disclosed, comprising: a user input element; a user output element; a transceiver; an encryption/decryption module; a synchronous module providing a synchronous output upon receiving a signal from the user input element; a functional module performing operations on data received from the transceiver and the synchronous output, and providing a functional result therefrom; and, an interpretation module receiving the functional result and activating the user output element according to the functional result.

The data may comprise public keys of another device. The data may comprise public keys of another device and a session identifier. The synchronous output may comprise a counter reading. The functional module may perform operations on a cumulative current counter reading obtained in a current communication session. The user output element may comprise at least one of a visual and audio output. The visual output may comprise color illumination. According to a further aspect of the invention, a processor coupled to a memory device and capable of alerting a user to an intrusion attack onto a communication line is provided, the processor operating to perform the functions: a. sending a first set of data to an auxiliary device; b. receiving a second set of data from the auxiliary device; c. using the first and second sets of data to generate a sequence of discrete values; d. upon receiving an input from a user, using the input to select one discrete value from the sequence; e. using the selected discrete value to generate an output; and, f. presenting the output to the user for verification. In step c the processor may be programmed to select one function from a family of functions, wherein the function produces output based on the input of the user.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Various embodiments of the invention enable a user to ensure that two electronic devices communicate securely over an insecure line, such as a wireless or wired communication line. Various embodiments prevent or alert the user to the presence of a third party security attack, such as a man-in-the middle attack. The following detailed description provides explanation of the general concept of the invention and particular implementations of various embodiments.

Figure 1:
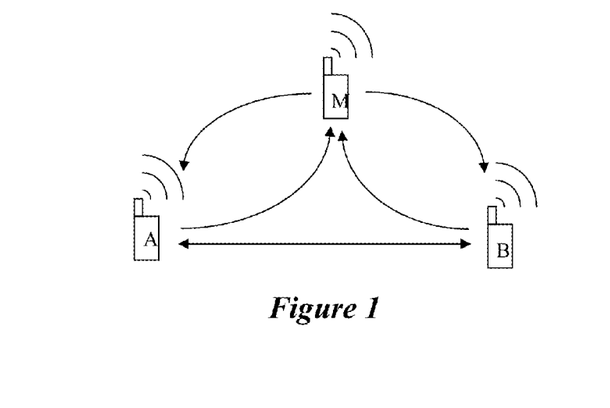
FIG. 1 illustrates a potential man-in-the middle situation, which may be detected and/or avoided according to various embodiments of the invention.

FIG. 1 illustrates a potential man-in-the middle situation, which may be detected and/or avoided according to various embodiments of the invention. In this example, device A seeks to securely communicate with device B; however, device M may be eavesdropping. For example, A may initiate a procedure for setting up the communication channel with B by sending device B electronic transmission $S_A$. At that point, M may "highjack" A's transmission and relay to B a modified signal, $S_M$, pretending to be sender A. Upon receiving signal $S_M$, B believes it to be from sender A and replies to A by sending $S_B$. M now highjacks $S_B$ and relays to A a modified signal $S_M$. At this point, A believes that he communicates with B, while B believes that he communicates with A, however all communication passes through M.

Various methods have been proposed to prevent or identify the presence of the situation illustrated in FIG. 1. As noted above, some proposals have the two intended devices, i.e., A and B, produce a human verifiable output (e.g., visual display or audible sound), and proceed with the communication only if the user verifies that the two outputs match. However, while some proposals utilize the human user for the verification step, none of the proposals consider employing the user in the encoding process. As will be described in more details below, various aspects of the invention utilize the user's ability to introduce randomness into the process to make the coding more difficult to intercept.

According to one aspect of the invention, prior to exchanging data, devices A and B perform a verification process as follows. First, A and B exchange predetermined information, such as public keys, signatures, session ID, etc. A and B also receive a predetermined synchronous input, such as a synchronous clock signal, an RSS feed, etc. Both devices A and B use the exchanged information and the synchronous input to generate an output. The user randomly selects the part of the generated output for devices A and B to issue for the user's verification. According to another aspect of the invention, the above process is iterated a number of times until the user is satisfied that the communication is indeed between A and B. According to yet another aspect, upon each iteration, at least part of the outputs generated in previous rounds is used to generate the current round's output.

According to aspects of the invention, a system and method is provided to verify that two devices communicate directly with each other, without an interception by a third party over the communication channel. In a typical application, the channel would be a wireless network connection and the two devices would initiate a verification process by exchanging information typically consisting of the public keys of the two devices. The exchanged public keys would subsequently be used to secure any further communication between the two devices.

According to further aspects of the invention, the system or method requires that both devices have an output modality interpretable by a human, i.e., the user. One of the devices, the user's "personal device," must have an input modality that can be operated by the user.

The input and output modalities can be very simple e.g., they can consist of a button and an audio or video output, e.g., LEDs. The inventive system and method may even work with a simple LED with an on and an off state. It may be more usable if each LED is able to display at least two colors in addition to its off state. According to one embodiment, the user would press the button multiple times. On each press, the LEDs on both devices illuminate according to a prescribed pattern, e.g., display a given color, and the user compares the illumination and verifies that they are synchronous. A noticeable delay or color difference signifies a security threat and should prompt the user to cancel the desired operation immediately. If a single color LED is used, the illumination pattern may be, e.g., a pattern of repeated on/off illumination of fixed or variable period.

The user requirements for carrying out the inventive verification method are exceedingly simple. The user must press a button repeatedly and check that both devices give the same expected output. Depending on the implementation, the user may be expected to check, for example, whether two light or two audible signals are synchronous and whether they are of the same color or pitch. Multiple buttons paired with multiple LED's or audio signals could be used, resulting in richer user input and higher security. The interaction would be equivalent to running multiple sessions of the protocol in parallel. Prior to the verifications step, keys are exchanged in some way. Depending on the key exchange protocol used, the requirements on the user may vary.

An embodiment of the communication and verification protocol according to the invention can be explained with reference to FIG. 1 as follows. The first Device A and the Second device B exchange some information $S_A$ and $S_B$ respectively, and the user verifies that the information is indeed identical i.e., $S_A=S_B$. For instance, $S_A$ could consist of the tuple $(e_A, e_B)$ where $e_A$ is information that A sent to B and $e_B$ is information that A received from B.

Both devices also receive synchronous input. In this embodiment the synchronous input is synchronized time. That is, both devices have a local timer, which can be synchronized by a message sent through the communication channel. This channel is unprotected and may be subject to active or passive attacks. The input and output modalities, however, provide a direct interaction with the user and cannot be manipulated by an attacker.

The verification process of this embodiment starts by the user interacting with the first device A through the first input modality, e.g., a button. When this interaction happens A will use the current value $t_A$ of its timer to compute a function $h(S_A, t_A)$. The first device A will send a signal through the communication channel and the second device (B) will similarly use the current value $t_B$ of its timer to compute a function $h(S_B, t_B)$. Both devices communicate the values computed by function h to the first and second output modality, respectively, e.g., LED's, audio pitch, etc. The user compares the signals received from the two devices: unequal signals indicate that $S_A$ and $S_B$, differ; while equal signal indicate but do not guarantee that $S_A$ and $S_B$ may be equal. The user also verifies timely arrival of the signals from both the first and second output modality: delay between the original input and either of the output signals or between the two output signals indicates a possible attack on the communication channel. The user may repeat the process through several rounds, each time increasing the confidence that $S_A$ and $S_B$ are equal.

As can be understood, according to this embodiment, the user's interaction with device A is equivalent to a random selection of the timer input. Consequently, the function generated by devices A and B includes both a transmitted value, e.g., a public key, and a randomly generated value, i.e., the random time selected by the user. In this manner, the human user is used on one hand to interject randomness into the encoding function and, on the other hand, to verify the final results. The user interaction resulting in timing information, and possibly other information, can be obtained in many ways: from button presses to audio commands. The output signal can be binary or multi-valued, and can be simple or complex visual, audio, or tactile signals.

The problem solved by the described embodiment arises in many situations, for example after a key exchange protocol has been performed between the two devices. Suppose A sends its public key $e_A$ to B and B sends its public key $e_B$ to A. The inventive verification method can be used to detect a man-in-the-middle attack by comparing the two tuples $S_A=(e_A, e'B)$ and $S_B=(e'_A, e_B)$, where A believes $e'_B$ is B's public key and B believes $e'_A$ is A's public key.

Another possible application is the electronic signing of contracts, where the user wishes to verify that the contract stored on the first device is the same as that stored on the secured device.

Note that, if the exchanged information consists of public keys as described above, then device A does not necessarily obtain assurance that device B knows the private key $d'_B$ that corresponds to the received public key $e'_B$. This leads to an attack whereby a malicious device M would be able to relay information between the devices A and B even though the malicious device M would not be able to decrypt that information. However, device M may use this attack to make device A (and the user) believe that device B is closer to device A than it actually is.

The described attack can be prevented easily by augmenting the inventive system in the following fashion: during the exchange of public keys, device A encrypts a nonce (a random number used only once) with the public key of device B and sends the cryptogram to device B. Device B must decrypt the cryptogram and include the nonce into the information that is compared in the inventive protocol. Device B performs the corresponding operations. By performing the inventive protocol, the user is assured not only that the keys and cryptograms were transmitted correctly, but also that the respective other device could decrypt the cryptogram, and therefore has access to the private key that corresponds to the public key under verification.

The complexity in "hacking" the above-described embodiment can be explained as follows. In the case where A communicates directly with B, both A and B have the exchanged information between A and B. i.e., $S_A$ and $S_B$, and both have the same synchronized input, e.g., time t. Both A and B use a hash function to operate on the variables ($S_A$, $S_B$, t) to obtain and output $x_A$, and $x_B$, which, when the variables are the same, would be the same, i.e., $x_A = x_B$. However, if a man-in-the-middle attack is taking place, then A has the variables ($S_A$, $S_M$, t), while B has the variable ($S_M$, $S_B$, t), where $S_M$ is the information supplied by the third party. Under such condition, in order to avoid detection, M must find an $S_M$ such that for any t, $S_M$ will result in $x_A = x_B$.

Figure 2:
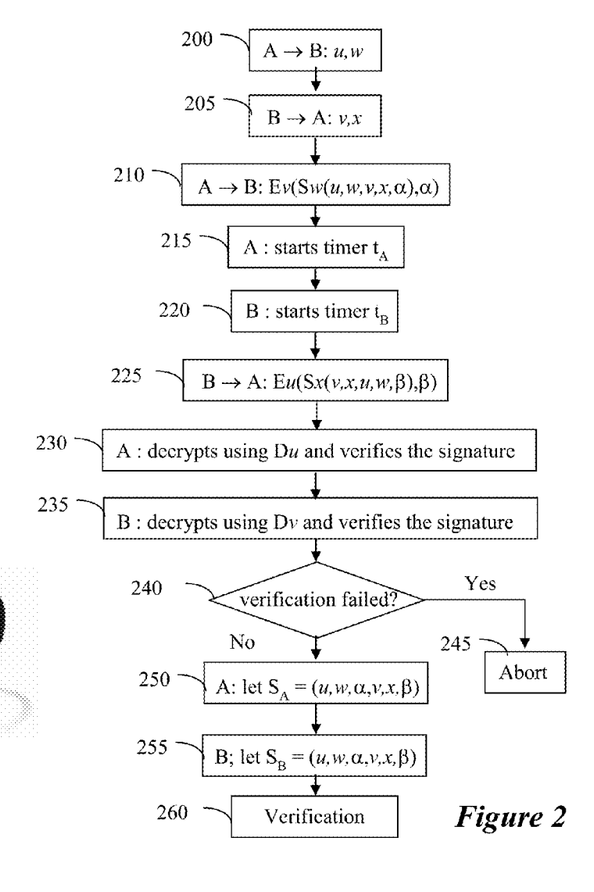
FIG. 2 is a flow chart illustrating a process according to an embodiment of the invention.

FIG. 2 is a flow chart illustrating a process according to an embodiment of the invention. The following detailed description of the embodiment of FIG. 2 includes a specific key exchange protocol. In this example the first device (A) may be, e.g., a portable device, smart card, cell phone, etc., communicating with a second device (B) that could be, e.g., an ATM, a point-of-sale terminal, etc. The user input may be obtained from button presses on device A and the output signals may be lights from LEDs on the two devices.

For this example it is assumed that both devices have public/private key pairs and can perform encryption and digital signatures using these keys. In FIG. 2, $E_k$ is used for the operation of encrypting using the public key k, $D_k$ for the operation of decrypting using the private key associated with public key k, and $S_k$ for digitally signing using the private key associated with k. In this example device A uses public key u for encryption and public key w for its digital signature scheme, and device B uses public key v for encryption and public key x for its digital signature scheme. The devices may establish a shared key by carrying out the process illustrated in FIG. 2, where $\alpha$ and $\beta$ are randomly chosen from a sufficiently large set.

The process of FIG. 2 starts when at step 200 A sends to B its two public keys, u and w. In reply, at step 205 B sends to A its own two public keys, v and x. A then encrypts the digitally signed set Sw(u,w,v,x,$\alpha$), where $\alpha$ is a nonce used to identify the session, and at step 210 sends the encrypted message to B. At step 215 A starts its clock and at step 220 B starts its clock. In this example, we assume that any difference between A and B starting the clock is so short as to not be perceptible to the user. At step 225 B sends to A a complementary encryption using the nonce $\beta$. At step 230 A decrypts the encrypted message from B using A's private key, and at step 235 B decrypts A's encrypted message using B's private key. At step 240 if the verification at either device fails, the process is aborted at step 245. On the other hand, if the verification is successful, each device sets its verification information at step 250 and 255 to $S_A=(u,w,\alpha,v,x,\beta)$ and $S_B=(u,w,\alpha,v,x,\beta)$, respectively. To complete the verification according to embodiments of the invention, this information is convolved with a synchronous input, such as time, to make the final verification comparison by the user.

Notably, in FIG. 2 it is shown that A and B start their timers at steps 215 and 220; however, this timing is not crucial. A and B may simply use one agreed-upon communication event to synchronize their local timers. While it is possible that an adversary may delay this communication and thus foil the synchronization, the inventive method will later detect such interference. Thus, this example does not require an elaborate secure clock synchronization protocol to be performed.

An adversary performing a man-in-the-middle attack would perform this protocol separately with each device, resulting in two values $S_A$ and $S_B$ that differ. For this reason we take $S_A$ and $S_B$ as the input to the verification step which, when successful, precludes a man-in-the-middle attack with high probability.

In the verification step 260, both devices make use of a collision resistant cryptographic hash function h to compute a hash value on the shared information S and the synchronized input, here the current time t. Each device then renders the hash value in some human perceptible way. The user verifies that the hash values on the two devices are the same and that there is no excessive delay. Notably, this embodiment takes advantage of the inability of the adversary to manipulate time. A time interval $\delta$ is defined as the shortest time such that a user detects a lag between two similar simple displays rendered at times t and t+$\delta$, respectively. The value of $\delta$ can be determined experimentally for a broad group or a focused group. Here it is assumed that the timers of devices A and B increment their values at rate of $2\delta$, but other choices for the rate are possible.

To interject randomness into the time factor, the timers are responsive to the user's input. For example, if device A is the user's personal device, the user may press a button on device A to provide the randomness and start the verification step 260. The following is an example for the implementation of the verification protocol 260. This example assumes that device A has a user activated button and an on/off indicator, such as a visual display (LED), an audio buzzer, etc.

Whenever its timer increases, device A performs the following algorithm:

```
1: if the button state switched from off to on, then
2:     asynchronously send an on-signal to device B
3:     Set x to h(S_A,t_A)
4:     if the least significant bit of x is 1, then
5:         set the display state to on
6:     end if
7: else if the button state switched from on to off then
8:     Asynchronously send an off-signal to device B
9:     Set the display state to off
10: end if
```

Here, it is assumed that the time it takes to calculate h and to send a signal to device B is significantly slower than $\delta$. Device B performs a matching algorithm:

```
1: if an on signal is received then
2:     Set x to h(S_B,t_B)
3:     if the least significant bit of x is 1 then
4:         Set the display state to on
5: end if
6: else if an off-signal is received then
7:     Set the display state to off
8: end if
```

This example allows the user to "sample" and compare bits of information derived from the two checksums previously exchanged by the two devices A and B. The sampling is triggered by the user pressing the button on device A. If devices A and B would display different values (i.e., if a man in the middle attack took place) then the eavesdroppers only choice to prevent the user from noticing this fact would be to delay the on-signal for a period of at least δ. With a probability of 0.5 the next bit selected by device B has the same value as the bit currently displayed on device A. However, by assumption this incurs a noticeable lag in the display of device B, which will alert the user to the attack.

As can be understood, features of the above embodiment of the invention include the use of the human to do at least part of the verification, the use of random human interaction to add unpredictability, and the incorporation of the timing of the signal. Many variations are possible, including computer amplification of user randomness, entering a sequence of clicks and then checking the sequence, and different time scales for entry and display. Those schooled in the art will easily be able to find other variants, e.g., based on different input and output modalities and variations of the functions that are used to determine x based on, but not limited to, the inputs of S and t.

In the examples provided so far, the user was able to verify that the two pairing devices exchanged their mutual keys and to detect a man-in-the-middle attack. The mechanism is easy to understand and use, and has minimal user interface requirements. While it can be implemented cheaply, it exceeds what has been suggested as the optimal level of security for this class of mechanisms. In the above example each device had an off/on verification device, a more complicated device may also be used. For example, a light capable of displaying two or more colors may be used. The user's trusted device, e.g., device A, also includes one button for the user's input. If more than one light colors are used, when the user clicks the button, both devices light at a color determined by the results of the hash function operating on the input and the time value. A color difference or noticeable delay between the lights indicates an active attack. The user may perform multiple rounds of this simple interaction, as more rounds increase the security. This mechanism leverages randomness in the users' button clicks. The colors may depend on exchanged keys and accumulated clock readings at the times the user presses the button. The clock rate is chosen such that a color-changing attack on the trigger signal manifests as a noticeable delay.

As explained above, the invention may be implemented to enable various mobile devices to communicate with other mobile or stationary devices. To illustrate the simplicity of implementing the invention, the following description is of an embodiment implementing the invention in the form of a ring.

Figure 3:
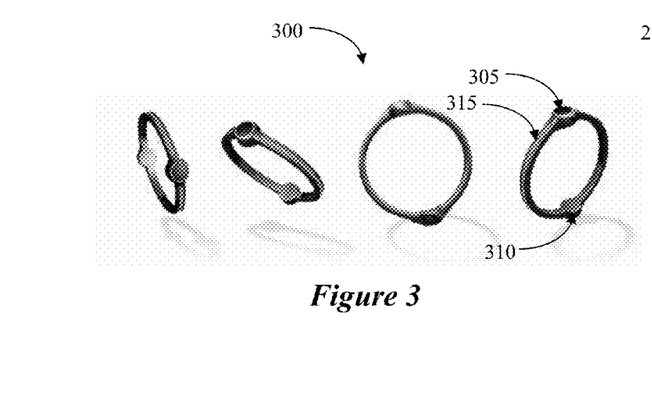
FIG. 3 depicts an embodiment of the invention in the form of a ring.

FIG. 3 depicts an embodiment of the invention in the form of a ring. The ring 300 in this embodiment has two buttons, 305 and 310, and illuminated rim 315. In this embodiment the rim can be illuminated in at least two different colors. The ring 300 may be implemented in the similar fashion as the "JAVA Ring" that Sun Microsystems introduced at the Java-One Conference in 1998. The JAVA Ring supported modular exponentiation, ciphers, hash functions, random number generation and a real-time clock, to name a few features. The actual device consisted of Dallas Semiconductors' DS1955 iButton mounted on a ring as the signet jewel. Dallas Semiconductors even obtained FIPS 104-1 Level 3 certification for its DS1955, which requires tamper protection, detection and response methods in addition to FIPS approved cryptographic methods. The ring 300 also includes a transceiver to exchange communication with other mobile or stationary device. The communication may be wireless RF, wired, IR, etc. For IR communication one of the buttons 305 or 310 may serve as an IR transparent window.

According to this embodiment, the user would choose one button 305 or 310 for the key verification protocol. If the protocol completes without evidence of an attack, then the user's hand turns and the user triggers the actual transaction by pressing the second button, 305 or 310. The ring 300 can determine which button is used first and accept input from it so that the user does not have to learn in what order the buttons must be used.

The ring 300 may collect the keys of terminals or other mobile devices it encounters and allow the user to associate configurable default actions with them. On subsequent encounters these actions could be triggered simply by pressing one of the ring's buttons. For known keys, a regular protocol can be used for authentication and encrypted session establishment, and associated actions would be executed over the secured channel. In this fashion, the ring can be used to control a variety of repetitive authentication and instruction tasks such as opening doors or to log into devices that account and bill for usage. Its default action mechanism would provide flexible ways to safely communicate with these other devices.

Figure 4:
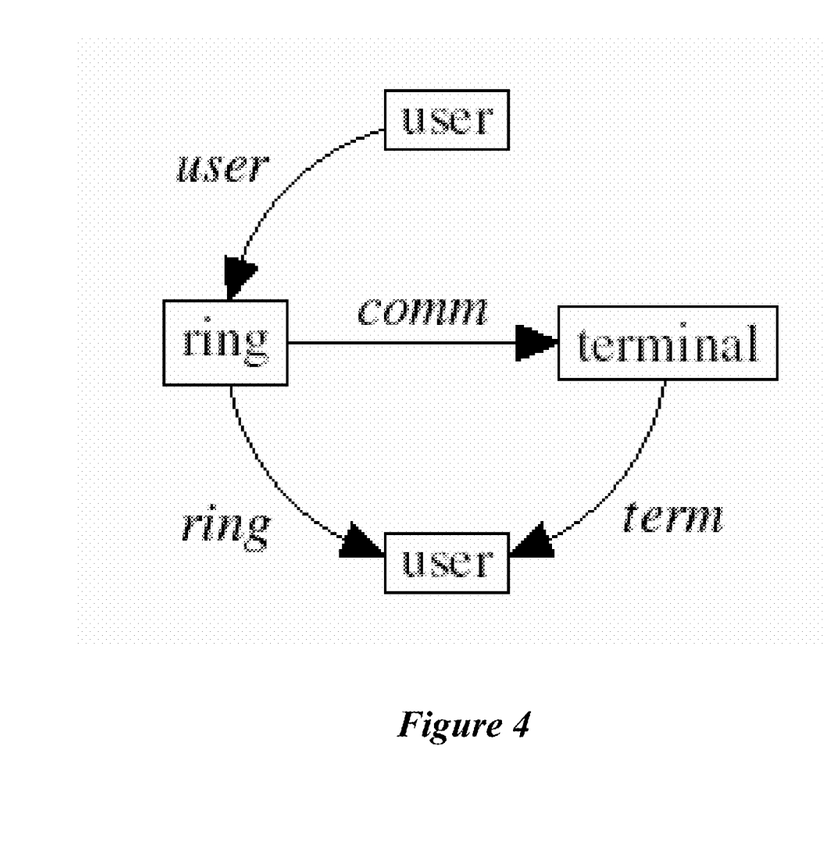
FIG. 4 illustrates the unidirectional communication channels connecting the actors.

For the purpose of demonstration, the ring protocol is modeled here as interactions between a user, ring and a terminal. They are referred to jointly as actors. The user is a human; the ring and terminal are electronic devices. All actors are connected by the unidirectional communication channels shown in FIG. 4. Communication over channels is written as c!x (send) or c?y (receive), where c is a channel name, x is a variable or literal and y is the name of the variable which receives the sent value. For example, if the ring lights with blue color and the observer sees this and records the color in variable x, then we can describe these two processes as ring!'blue' and user?x.

We describe our protocol and analyze its security based on idealized cryptographic primitives. The protocol makes use of a one-way hash function h. For a given k let $P_k$ be a random trapdoor permutation and let $Q_k$ be its inverse. Both $P_k$ and $Q_k$ shall be efficient to compute, but deriving $Q_k$ from $P_k$ and k shall be infeasible unless the trapdoor information is known. Based on $P_k$ and $Q_k$ we define asymmetric encryption as $E_k(m)=P_k(0|m)$ and signature computations as $S_k(m)=Q_k(1|m)$, where "|" indicates string concatenation. Decryption and signature verification follows in a straightforward fashion:

$$D_k(c) = \begin{cases} m & \text{if } Q_k(c) = 0|m \\ \text{error} & \text{else} \end{cases}$$

$$V_k(m,\sigma) = \begin{cases} \text{true} & \text{if } P_k(\sigma) = 1|m \\ \text{false} & \text{else} \end{cases}$$

By prepending encrypted and signed message with 0 or 1 respectively, we separate Pk into two independent permutations. This allows us to use a single key k for both encryption and signing in the description of our protocol. At the same time, the adversary cannot obtain the decryption of c by asking the party who knows Qk to sign a challenge c.

For this example it is assumed that the user, the ring and the terminal are trustworthy and secure against manipulation. The out-of-band channels user, ring, and terminal shall be secure against active attacks. It is assumed that in-band channel Communication is insecure. The adversary may perform passive and active attacks on it. It is also assumed that the user is perfect in the sense that the user detects an attack whenever our system signals an attack.

The ring and the terminal begin the protocol by exchanging their public keys u and v. Next, they exchange signed and encrypted session identifiers α and β, randomly chosen from a space large enough to render guessing attacks infeasible. Both the ring and the terminal decrypt and verify the received information. If either device determines that the signature of its pairing device is invalid then it aborts the protocol. Otherwise, the devices compile the public keys and session identifiers into γR and γT, respectively, and input the information into the key verification process. The process is summarized in Table 1 below. It is worth noting that the terminal cannot obtain α unless it knows the decryption function $D_v$ for its choice of v. This prevents an imposter terminal from supplying a public key for which it does not possess the corresponding private key.

TABLE 1

Setup phase of the ring protocol. The values $\gamma_R$ and $\gamma_T$ are input to the key verification stage.

| state | ring (transition) | terminal (transition) |
|---|---|---|
| S1 | comm ! u | comm ? u' |
| S2 | comm ? v' | comm ! v |
| S3 | comm ! $E_v(S_u(u, v, \alpha), \alpha)$ | comm ? y |
| S4 | comm ? x | comm ! $E_u(S_v(v, u, \beta), \beta)$ |
| S5 | $(\sigma_T, \beta') := D_u(x)$ | $(\sigma_R, \alpha') := D_v(y)$ |
| S6 | $b_R := V_v((v', u, \beta'), \sigma_T)$ | $b_T := V_u((u', v, \alpha'), \sigma_R)$ |
| S7 | if $\neg b_R$ then abort | if $\neg b_T$ then abort |
| S8 | $\gamma_R := (u, \alpha, v', \beta')$ | $\gamma_T := (u', \alpha', v, \beta)$ |
| S1 | comm! u | comm.? u' |
| S2 | comm? v' | comm! v |
| S3 | comm! $E_v(S_u(u, v, \alpha), \alpha)$ | comm? y |
| S4 | comm? x | comm! $E_u(S_v(v, u, \beta), \beta)$ |
| S5 | $(\sigma_T, \beta') := D_u(x)$ | $(\sigma_R, \alpha') := D_v(y)$ |
| S6 | $b_R := V_v((v', u, \beta'), \sigma_T)$ | $b_T := V_u((u', v, \alpha'), \sigma_R)$ |
| S7 | if $\neg b_R$ then abort | if $\neg b_T$ then abort |
| S8 | $\gamma_R := (u, \alpha, v1, \beta')$ | $\gamma_T := (u, \alpha, v, \beta)$ |

Figure 5:
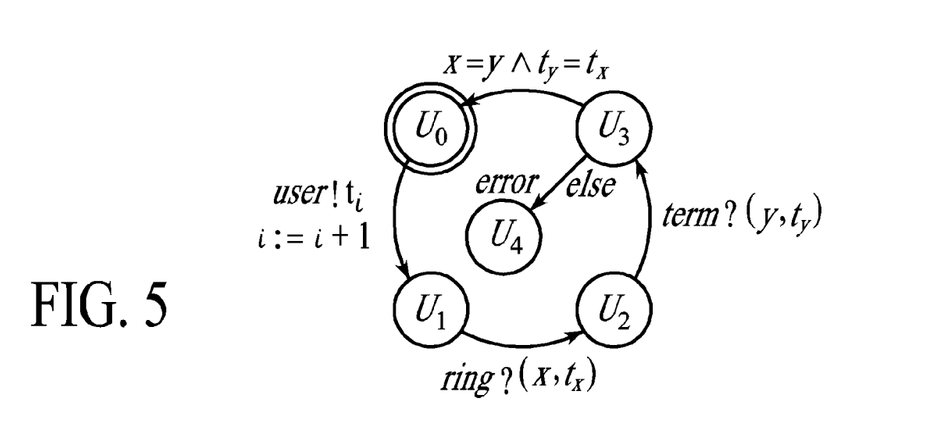
FIG. 5 illustrates the user model as an I/O automaton.
Figure 6:
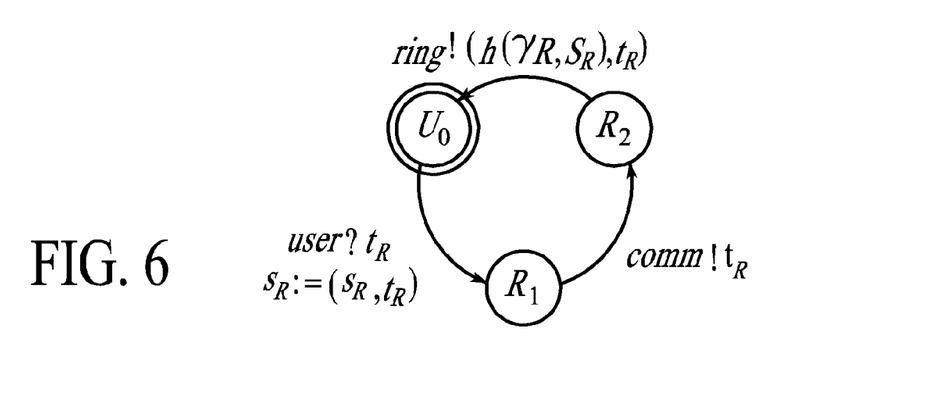
FIG. 6 illustrates the ring model as an I/O automaton.
Figure 7:
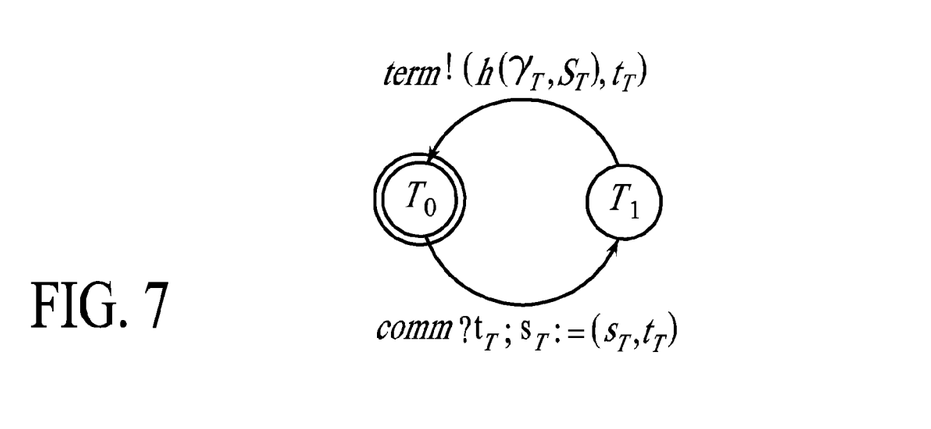
FIG. 7 illustrates the terminal model as an I/O automaton.

The key verification process consists of multiple rounds and is specified in FIGS. 5, 6 and 7 in the form of three I/O automata. One automaton models the behavior of the user, the second models the ring and the third models the terminal. Figure 5 illustrates the user model as an I/O automaton. In this illustration x=y holds if and only if the ring and terminal show the same color: $t_x = t_y$ holds if and only if the lights of the ring and the terminal come on synchronously. FIG. 6 illustrates the ring model as an I/O automaton. FIG. 7 illustrates the terminal model as an I/O automaton.

A round starts if one of the three automata leaves an accepting state ($U_0$, $R_0$, and $T_0$ indicated by double circles) and the round ends if all three automata are again in an accepting state. A round is started by the user in state $U_0$ pressing the ring's button. In doing so, the user enters state $U_1$ and implicitly selects a discrete time $t_i$ where i is the round number, and transmits $t_i$ to the ring. The ring relays $t_i$ to the terminal via the (insecure) channel comm. Next, the ring queries the one-way hash function h with input $\gamma_R$ and $S_R = (t_1, \ldots t_i)$ and transmits the result together with $t_i$ to the user. Meanwhile, the terminal performs the same query and sends its results to the user as well. The user compares both results. If they are not equal, then the user rejects and terminates the protocol. Otherwise, the user performs additional rounds until he is ready to accept. Acceptance is signaled to the ring by any acceptable mechanism, e.g., prolonged pressing of the button, pressing a second button, etc.

In the untimed model illustrated above, we assumed that the user sends an explicit time value to the ring. The ring relays the time value to the terminal, perhaps perturbed en route by an adversary. Both the ring and the terminal send their time values $t_x$ and $t_y$ and the outputs of their respective calculations x and y to the user who compares them for equality (see FIG. 5). However the user does not compare these values literally. This would not be very user-friendly nor, as will be demonstrated below, is it as secure as using the transmission times themselves, which an adversary cannot change without being detected.

Instead, in the following embodiment the values are encoded as simple visual or audio features, such that differences are easily perceived. More precisely, the user compares x and y by means of color (or tone) and compares $t_x$ and $t_y$ by means of synchroneity.

The timed mode requires a small addition to the setup phase. In state S1 of the setup phase, before the ring sends its public key u to the terminal, the ring resets an internal clock to zero. Upon receiving the ring's public key the terminal likewise resets its own internal clock to zero. The clock of the terminal is shifted a small amount ε of time with respect to the ring's clock. Both clocks increment their values at a rate δ where δ is above the threshold for perception. In other words, δ is the smallest delay between two (visual, audio, etc.) stimuli such that the stimuli are not perceived as synchronous by the majority of the user population. We assume ε<<δ.

When the user presses the ring's button, the button sends a down signal to the terminal, delays until the clock increments, reads the clock value $t_i$ and sets $S_R := (t_1, \ldots, t_i)$. Then the ring queries the hash function h with $\gamma_R$ and $S_R$, which yields a result b∈{0,1}. If b=1 the ring lights with one color, e.g., orange. Otherwise, it lights with another color, e.g., blue. When the user releases the button then the ring sends an up signal to the terminal, delays to the next clock tick and switches its light off. While delaying, the ring does not accept user input and the light remains on for a configurable minimum time.

When the terminal receives a down or up signal it behaves as the ring does upon a button press or release. For instance, if the terminal receives a down signal then it delays until the clock increments, reads the clock value $t'_i$ sets $s_T := (t'_1, \ldots, t'_i)$, queries the hash function h with $\gamma_R$ and $S_T$, and signals the user by lighting accordingly.

A potential race condition exists if the user presses the button within ε of the ring's (or the terminals) clock increment. If the ring makes a conservative estimate for the delay ε, the race condition can be avoided by delaying the effects of the button click until it falls within the same time interval for both devices.

The above ring example describes the inventive mechanism based on a specific output channel (lights), a specific input channel (a button), and a specific source from which we sample our validation points (time). In an abstract sense, the input channel provides a randomly chosen index into a source of validation points. The source must be integer, authentic and it must be available to both devices. The source must also have a certain level of variance but it does not have to be confidential or random. This gives us considerable flexibility in choosing the modalities and parameters on which our mechanism can function. Below, we briefly mention a few variants, but of course many others can be made.

Output channels: the number of colors can be increased, which increases the rate with which the security of the mechanism increases per interaction. This also significantly decreases the success probability of a random attack (without precomputation by the adversary). In the same vein, multiple lights can be employed. From here, it is obvious that our mechanism can be extended to any complex visual display and complex renderings (although this to some degree defeats the simplicity and elegance of our mechanism).

Other human senses can be leveraged as output channels as well. This includes audible output. Rather than two colors we can employ two sounds or melodies to signify two different results of our validation procedure. Even tactile output can be rendered using Braille-type displays, etc.

Input channels: rather than using a button, utterances can be used instead to trigger a sampling if the user's device has a microphone. If both devices feature microphones then both devices may simultaneously use this input as a trigger. This would eliminate the need to transmit a trigger signal from one device to the other. It would also eliminate the need to observe delays because delays are meant to uncover manipulations of trigger signals that are transmitted in-band.

If one or both devices feature proximity sensing then a change of distance between the two devices can serve as a trigger signal as well. Along the same lines, relative or absolute position changes measured through the Global Positioning System ("GPS") or similar services can serve as yet another source of trigger signals.

Note that, if the trigger signal can be measured by both devices and if the signal has sufficient variance, then the measured value can serve directly as the index into the source of validation points. The measured values may even become the source of validation points.

Source of validation points: we used running clock values as the source for validation points and time as an index. This has a number of advantages. Time is always available and monotonously increasing, and time itself cannot be manipulated easily. However, any source with sufficient variance can be used if it can be assumed that the source is known or accessible to both devices. For instance, if both devices can measure proximity, then a change of their mutual distance can serve not only as a trigger signal but also as a source of validation points. Other potential sources of validation points are broadcast signals or previously fixed data.

Figure 8:
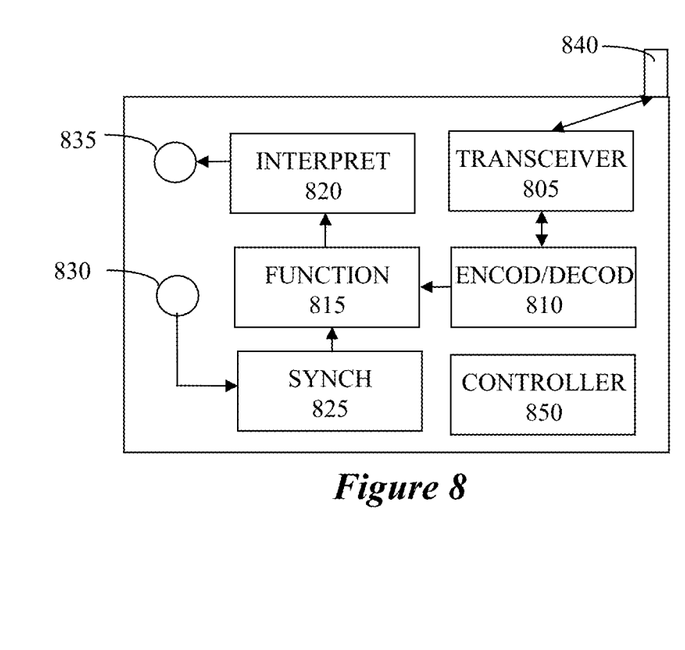
FIG. 8 illustrates a generic mobile device according to an embodiment of the invention.

FIG. 8 illustrates a generic mobile device according to an embodiment of the invention. The mobile device may be, e.g., a laptop computer, PDA, cellphone, mobile GPS, ID card, etc. The device has a transceiver 805 for communicating with other mobile or stationary devices via, e.g. antenna 840, USB or Firewire connection, etc. The transceiver may transmit and/or receive encoded messages that it exchanges with encoder/decoder 810. For example, the encoder/decoder 810 may encrypt a message using another device's public key and provide it to transceiver 805 for transmission to the other device. Similarly, the transceiver 805 may receive an encrypted message from the other device and relay it to decoder 810 for decrypting.

A synchronous input 825 may be implemented as, e.g., a timer, an RSS feed, distance measurement, etc. It provides a synch value to functional module 815 whenever it receives a signal from the user input element 830. The user input element 830 may be a simple button, a distance sensor, etc. The functional module 815 operates on data received from the encoder/decoder 810 and the synch value from the synchronous input 825. As illustrated above, in some embodiments the data is public keys and session identifiers. Also as was illustrated above, the functional module 815 may employ a hash function. The functional module 815 provides its operation results to the interpreter 820, which analyzes the result and based upon the result provides an instruction to the user output element 835. For example, the interpreter may inspect the least significant bit of the result and if it's "1" instruct user output element 835 to illuminate in one color and if it's "0" illuminate in another color. The operation of the mobile device is controlled by controller 850.

Figure 9:
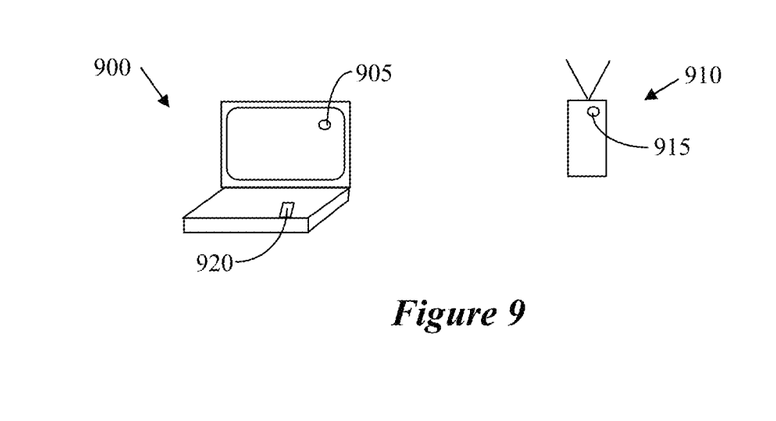
FIG. 9 illustrates another embodiment of the invention, which may be implemented in, e.g., connecting to a WiFi access point.

FIG. 9 illustrates another embodiment of the invention, which may be implemented in, e.g., connecting to a WiFi access point. In FIG. 9 a user attempts to connect a user device 900 to a target device 910. User device 900 may be, e.g., a laptop computer, while target device 910 may be, e.g., a WiFi access point (hotspot). In this scenario, we cannot assume that the user's device 900 and the target device 910 share a secret key or possess public key certificates signed by mutually trusted third parties. Instead, the devices exchange public keys over the insecure wireless channel, and use them to secure their communication. The user thwarts man-in-the-middle attacks by authenticating the exchanged keys over the low-bandwidth (authenticated) visual channel. This can be accomplished efficiently by "short authentication string" protocols as they have been described in the art and proven secure. A simple, but typical, protocol of this class is the message authentication protocol described, a version of which is illustrated in FIG. 10.

Figure 10:
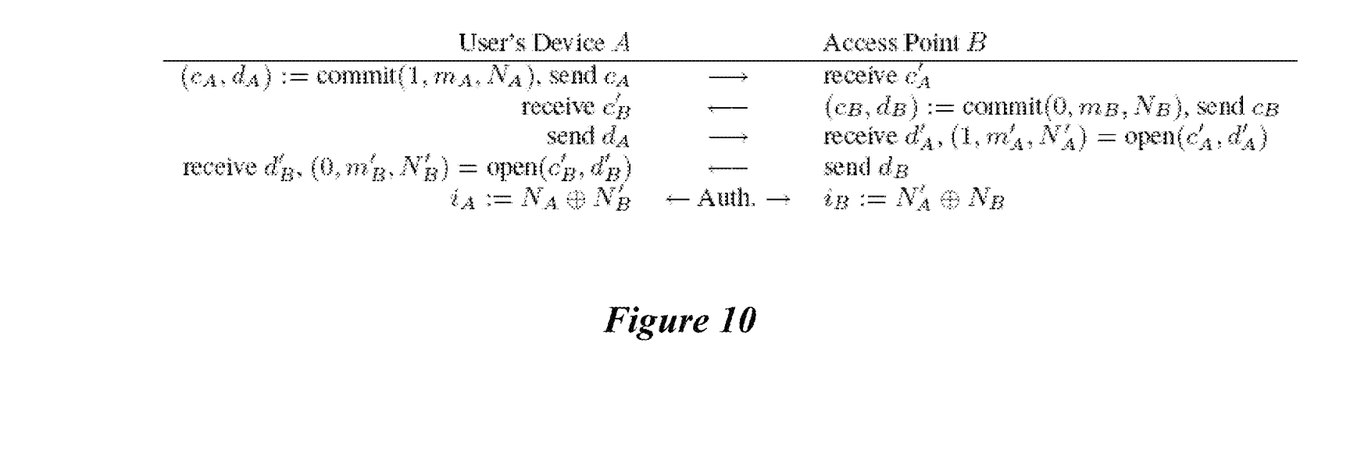
FIG. 10 illustrates an example of a short authentication string protocol used in certain embodiments of the invention.

As illustrated in FIG. 10, during the setup phase, the two devices commit to their public keys and nonces NA and NB. The nonces can be short, hence the name "short authentication strings." However, they should be longer than the maximal number of comparisons the user is willing to perform. Commitments are defined by functions commit(x) returning a pair (c, d) and open returning the committed data, given c and d, i.e. open(commit(x))=x. If the protocol proceeds without interference, NA=N'A and NB=N'B. Under a man-in-the-middle attack by an evil twin, the protocol assures that with high probability NA≠N'A so NA⊕N'B≠N'A⊕NB. The probability of such an occurrence is unconditional of the amount of computational power the adversary has. The point of the verification is to distinguish these two cases.

In the embodiment illustrated in FIG. 9, a particular technique is provided for realizing the authenticated channel and performing the short string comparison. The authenticated channel is essentially made up of two channels: the user can physically observe lights on both devices, creating two authenticated channels; one from A (user device 900) to the user and one from B (target device 910) to the user. According to the embodiment of FIG. 9, instead of sending N'A⊕NB through one authenticated channel to A where it is compared with NA⊕N'B, both devices display their respective values through their respective lights 905, 915. The user then performs the comparison.

Additionally, instead of just showing the user two parallel sequences of colored lights, the user is actively involved in controlling the comparison. This is achieved as follows. The bit strings NA⊕N'B and N'A⊕NB define two sequences of colors that agree when there is no intruder. By pressing a button or key 920 on user device 900, the user advances one step in the sequence so as to turn on the next color light 905, 915, of the respective sequence in each device. In this example, as long as the user holds the button 920, the lights remain on, allowing to user to determine the time needed for comparison.

In the embodiment of FIG. 9, user device 900 relays the user's button push to device 910 through the open, high-speed channel. By interfering with this channel, an intruder will be able to suppress a click, alter the duration of the light, or create additional clicks. To ensure that these changes will be detected by the user, the embodiment of FIG. 9 requires that each light remains lit for a perceptible minimum time. The user can choose the number of button clicks to use based on the required security. When the user is satisfied that there has been no intrusion, user signals "accept" to device 910 via user device 900, which completes the protocol.

To protect against a denial of service attack, there needs to be a bound on the number of clicks allowed as well as a timeout for the delay between two consecutive clicks. In an environment where multiple users try to authenticate a shared device (e.g. a Wi-Fi access point), the shared device needs to sequentialize authentication requests. In the embodiment of FIG. 9, the expected time for visual verification of short authentication strings will be less than 20 seconds. Therefore, for most applications the frequency of authentication requests is not likely to create excessive waits.

As can be understood, the embodiment illustrated in FIG. 9 can be used in other scenarios, e.g., to assure WiFi access from home. Though attacks in private neighborhoods occur less frequently than in public places, nevertheless attackers can set up evil twin access points outside private homes to attack home wireless networks. The described mechanism enables the user to ascertain whether she has succeeded in connecting to her own network. The mechanism can also be used to pair two alternative devices rather than a device and a hotspot. For example, it can be used to pair a wireless device with a printer to make sure sensitive documents are sent to the printer in front of the user rather than to a different printer, or other device, from which the confidential information can be stolen.

The mechanism is also useful for setting up ad hoc networks. For example, in some settings military personnel with little technical knowledge and training must be able to set up a secure ad hoc wireless network even in places like cities where untrusted wireless devices abound. Similarly, the mechanism can be used by neighbors in a community, perhaps in a third world country, to set up a roof-top wireless network by pairing sender and receiver antennas in line-of-sight. In some scenarios, or for some users, other modes for comparison, like audio, can be employed in place of the lights.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for performing a verification process to secure a communication session between two devices communicating over an insecure line, the verification process comprising:
   a. exchanging predetermined sets of data between the two devices;
   b. using the exchanged predetermined sets of data to generate in each device a sequence of discrete values;
   c. receiving an input from a user and using the input to select a same one of the generated discrete values at each of the two devices;
   d. using the selected discrete value to generate an output at each of the two devices;
   e. presenting the output from both devices to the user for verification; and
   f. repeating steps c-e according to user input.

2. The method of claim 1, wherein the predetermined sets of data comprise public keys of the two devices.

3. The method of claim 1, wherein upon receiving the user input in step c, the next sequential discrete value in the sequence is selected.

4. The method of claim 1, wherein presenting the output in step e comprises illuminating a colored light, wherein the color is selected according to the discrete value selected in step c.

5. The method of claim 1, further comprising providing a synchronous input to the two devices.

6. The method of claim 5, further comprising using the user input to select a value from the synchronous input.

7. The method of claim 6, wherein step d comprises providing the predetermined sets of data and the selected value into a pre-specified function and using the resulting value of the function to generate the output.

8. The method of claim 7, wherein the pre-specified function is a hash function.

9. The method of claim 7, wherein generating the output further comprises using the resulting value of the function to generate at least one of a discrete visual, audible, and tactile output.

10. The method of claim 9, wherein the output comprises a synchronized colored light on each of the two devices.

11. The method of claim 1, wherein at least one of the two devices is a mobile device.

12. The method of claim 11, wherein the mobile device is a wearable device.

13. The method of claim 1, wherein in step b one function from a family of functions is selected, wherein the function produces output based on the input of the user.

14. The method of claim 1, wherein the using the input to select one of the discrete values at each device is based on timer input.

15. A system comprising:
   a processor coupled to a memory device and capable of alerting a user to an intrusion attack onto a communication line, the processor operating to perform the steps of:
   a. sending a first set of data to an auxiliary device;
   b. receiving a second set of data from the auxiliary device;
   c. using the first and second sets of data to generate a sequence of discrete values;

d. upon receiving an input from a user, using the input to select a same one of the discrete values from the generated sequence at the processor and the auxiliary device;
e. using the selected discrete value to generate an output; and
f. presenting the output to the user for verification by comparison with a second output on the auxiliary device.

16. The system of claim 15, wherein in step c the processor is programmed to select one function from a family of functions, wherein the one of the family of functions produces the output based on the input of the user.

* * * * *